United States Patent
Dallet et al.

[15] 3,646,304
[45] Feb. 29, 1972

[54] INDUCTIVELY HEATING BRAZING PRESS

[72] Inventors: Bernard Dallet, Savigny-sur-Orge; Jacques Doucerain, Paris; Jean Moulin, Ris-Orangis, all of France

[73] Assignee: Societe de Traitements Electrolytiques et Electrothermiques (S.T.E.L.)

[22] Filed: July 13, 1970

[21] Appl. No.: 54,250

[30] Foreign Application Priority Data

May 14, 1970  France..................................7017658

[52] U.S. Cl..................................219/6.5, 219/85, 219/251
[51] Int. Cl............................................................H05b 5/00
[58] Field of Search..................219/6.5, 85, 243, 449, 450, 219/516

[56] References Cited

UNITED STATES PATENTS

| 2,632,082 | 3/1953 | Reichelt | 219/85 |
|---|---|---|---|
| 2,432,463 | 12/1947 | Watson | 219/243 |
| 3,435,171 | 3/1969 | Lohest | 219/471 X |
| 3,286,077 | 11/1966 | Radford et al. | 219/251 |

FOREIGN PATENTS OR APPLICATIONS

| 73,672 | 9/1960 | France | 219/85 |

Primary Examiner—R. F. Staubly
Assistant Examiner—Hugh D. Jaeger
Attorney—Flynn and Frishauf

[57] ABSTRACT

A mandrel, to hold the article to be heat treated and pressed, for example to hold a workpiece to form a cooking utensil, to which a bottom of highly heat-conductive material is to be applied, has a longitudinal opening formed therein through which a thermal-electric transducer, for example a thermocouple can be inserted, and its connections taken off; or, through which heat at the plate itself can be measured by infrared radiation. The thermocouple is connected to the control apparatus for the heater to cut application of electrical energy to an induction heater when tee heat at the interface of the mandrel, or an inserted thin heat-conductive sensing plate exceeds a predetermined value.

3 Claims, 4 Drawing Figures

INDUCTIVELY HEATING BRAZING PRESS

CROSS REFERENCE TO RELATED APPLICATION

U.S. Ser. Nos. 54,251 and 54,281, now U.S. Pat. No. 3,609,277.

The present invention relates to presses used in brazing operations, and more particularly, to presses which can operate at high temperatures, for example to braze, or fuse together a bottom of highly heat-conductive metal to a steel cooking utensil, and to control equipment for such presses to accurately control applied heat.

Presses used to effect fusion of flat, platelike structures together usually utilize an induction heater, supplied from the high frequency generator which supplies electrical energy to the inductor of the induction heater. The time of heating is usually controlled by preset timing devices. Since the thermal resistance, and conductivity of the materials to be fused together is not constant but rather varies, and since the backed-up support on which the elements to be fused also change in temperature, presetting the time does not insure accuracy and uniformity of the quality of the fused joint. If the fusion temperature range of the brazing alloys, i.e., of the flux metal is small, or if the material of the temperature distribution plate, to be fused to the cooking utensil, has a fusion point close to that of the flux metal commonly used, imperfect bonds may result, causing rejects. Indication heating devices frequently utilize temperature sensing elements, such as thermocouples, thermistors, pyrometers, infrared detectors, or other similar devices which provide an electrical output signal the level of which is a function of the temperature to be detected. These devices then control the supply to the high frequency generator which provides power for the induction heater.

Electrical sensing devices of the type referred to could not, however, be utilized in heating devices which are combined with compression apparatus, such as presses, since the interface between the two elements to be fused together is inaccessible. While it is of course always possible to fix a thermal transducer at the edges of an intermediate element, the temperature to which this element will respond is not that of the actual fusion point, at the interface, but will also be subject to fluctuations due to the thermal resistance of contact between the press elements, or interposed intermediate element such as a buffer plate, also termed a susceptor plate. Such susceptor plates are commonly employed and consist of a ferromagnetic material, such as soft steel. The thermal contact of the susceptor plate, or other elements on the apparatus changes with time, for example due to oxidation of the surfaces.

It is an object of the present invention to provide a sensing arrangement in fusion presses, to cut power to induction heating apparatus when a predetermined temperature is reached, in which the temperature being sensed is related in a predetermined manner to the actual fusion temperature, and largely independent of extraneous influences, by placing a temperature sensing element in a location directly exposed to the fusion heat.

SUBJECT MATTER OF THE PRESENT INVENTION

Briefly, the press includes a mandrel, or backup element on which cooking utensil can be placed, or any other element which is to be fused to a plate, by brazing and induction heating. The cooking utensil or structure, will hereinafter be referred to as the "workpiece," which is to be joined to a plate of a metal, which is usually different, and has good heat conductive properties. The plate and the metal are joined by a metallic flux, or brazing metal which is interposed between the plate and the workpiece. The difference between fusion temperatures of one of the materials, plate or workpiece and that of the brazing metal, or flux is often only small. The fusion itself results in a complex metallurgical intersticial structure which, for simplicity, may be called a brazed fusion. To accurately control the heat, and to disconnect electrical energy supplied to inductor windings, a thermal-electric transducer is applied to a surface of the workpiece and the mandrel is provided with a longitudinal opening or hole through which a signal can be conducted. The thermal-electrical transducer may be a thermocouple applied directly to the workpiece, or to an intermediate heat-distribution (and averaging) plate; alternatively, infrared radiation can be detected through the opening. Upon detection of temperature levels exceeding a certain threshold, power is disconnected by known disconnect control apparatus.

The invention will be described by way of example with reference to the accompanying drawings, wherein.

Figure 1:
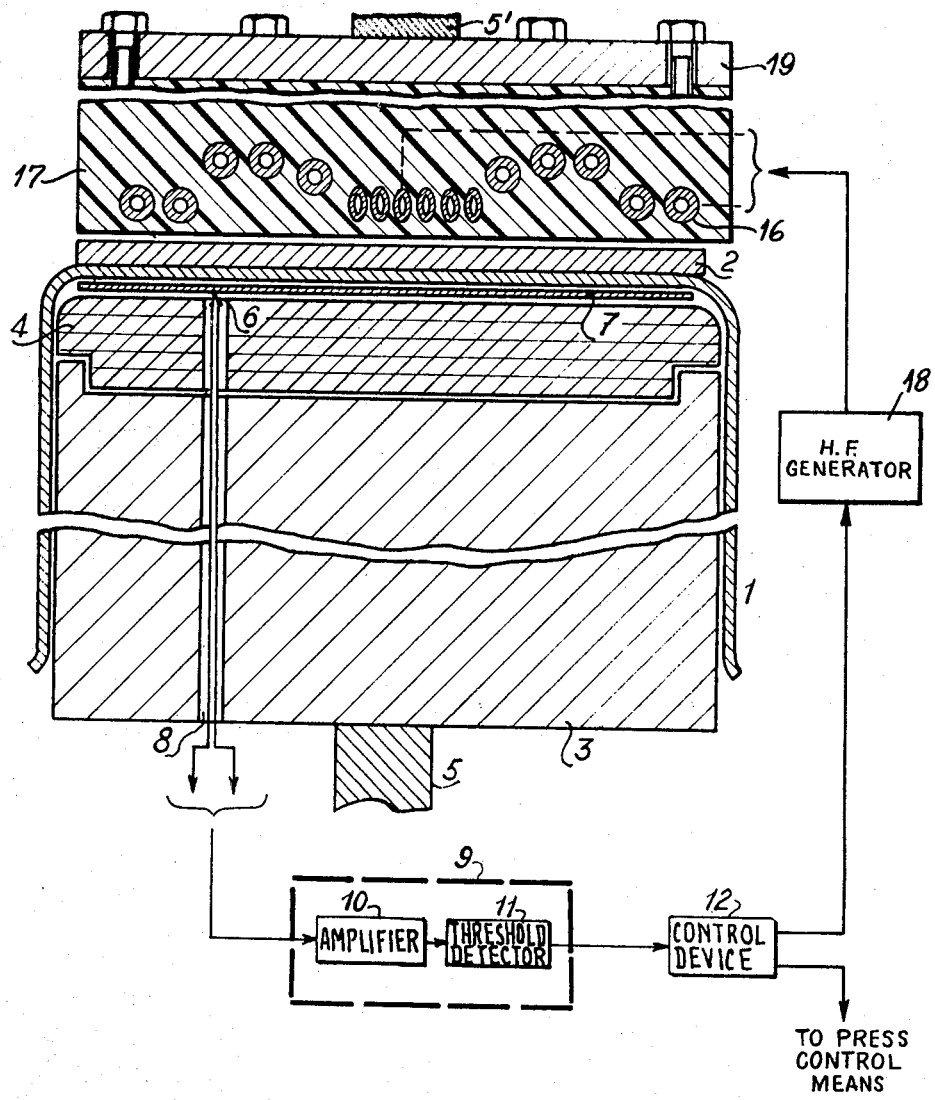
FIG. 1 illustrates an embodiment of the present invention in longitudinal cross sectional, schematic presentation.

Workpiece 1, shaped in form of a cooking pot, and, for example, of stainless steel has a plate 2 applied to the bottom thereof; plate 2 is a good conductor of heat, to form a heat distribution surface, and may be, for example, of aluminum or copper. Workpiece 1 is placed on a mandrel of the press, carried by the lower press stem 5, and which may be coupled to the press apparatus, not shown and not forming a part of the present invention. The mandrel is formed of two portions, the lower portion 3 being of metal, and the second, or upper portion 4, and in contact with the bottom of the workpiece being of good heat-insulating material, such as asbestos cement. The relative sizes of the two materials are exaggerated in FIG. 1. The upper part of the brazing press, shown only in part since it may take any desired known form, has an inductor winding, 16 encased in a block 17 of plastic material (resin), this block 17 being carried by a plate 19 fixed to the upper stem 5 of the press, the inductor 16 being fed from a high frequency power generator 18 and a ferromagnetic susceptor plate bearing against the plate 2. One form of inductor winding 16, and the assembly of the ferromagnetic plate with the inductor winding is shown and described in copending application serial No. 54,251 filed July 13, 1970.

Figure 2:
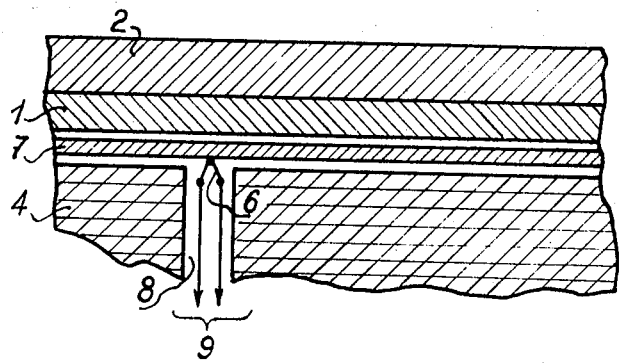
FIG. 2 is a fragmentary view of a portion of FIG. 1, to a greatly enlarged scale illustrating application of a thermocouple.

In accordance with the present invention, power is disconnected to the high frequency generator 18 feeding the inductor depending on sensed temperature at the brazing point. A thermal-electric transducer is so located that the temperature at the face of the workpiece, or at least at the top of the element 4 of the mandrel, is sensed, as best seen in FIG. 2. A thermocouple 6 has its junction connected by soldering, brazing or the like to a thin plate 7 of stainless material and of low-specific heat. Plate 7, presenting low-thermal contact resistance with workpiece 1 is interposed between the upper portion of the mandrel 4 and the bottom of the workpiece 1, preferably extending over the entire surface of the workpiece. Thus, the surface of plate 7 will correspond essentially to the extent of the surface of the plate 2 to be applied to the workpiece. The plate 7 preferably is a thin sheet of stainless steel, and the thermocouple 6 consists of two different alloys of nickel, and known under the terms of chromel and alumel.

A small-diameter hole 8 is formed through the two parts of the mandrel, that is through parts 3 and 4, to permit the wires from thermocouple 6 to be passed therethrough. The wires are connected to a known type of electronic detector 9, which includes, preferably, an amplifier 10 and a threshold detector 11, connected in series. Threshold detector 11 may be any known circuit, such as a voltage comparator, and may include bistable, or monostable flip-flops, the commutating, or switchover potential of the flip-flop circuit being controllable so that the threshold can be set. The control potential, as well as the potential from thermocouple 6 can be applied to the respective control electrodes of the active elements of the flip-flop to determine the switchover threshold. The threshold level itself is set to represent a predetermined temperature, usually determined experimentally, and at which the brazing press provides perfect quality articles.

The output of threshold detector 11 is connected to a control unit 12, controlling the supply of power to the high frequency energy generator 18, for example, and contains the usual switches and control circuits known by and themselves.

A group of similar press stations can be placed on a single table, and the temperature at various ones of the workpieces determined serially, for successive read out. FIG. 4 illustrates a turntable 20, rotatably arranged beneath induction heads (not shown), as schematically indicated by arrow 21. Each one of the press heads 22, including mandrel 3, 4 (FIGS. 1, 2, 3) are formed with an opening 8, connectable to connecting elements 23, which may be in the form of slider contacts or the like, or sensing heads as will be explained in connection with FIG. 3; the output from elements 23 is connected to a commutating-type switch 24, synchronized, as schematically indicated at 25 with the rotation of turntable 20. The output from the rotating commutating switch 24 is connected to a terminal 25 which, in turn, connects to units 9 (FIG. 1) or 11 (FIG. 3), respectively. A reading of temperature at the interfaces of the various press heads 22 is thus, selectively, obtained when the press heads are in any particular position. A group of work stations can thus be arranged, for example one to locate a workpiece on a mandrel, another to place plate 2 over the workpiece 1, another to fuse and bond the heat distribution plate to the workpiece 1, and another to remove the completed assembly. The induction heater, press will be above the third work station.

Figure 3:
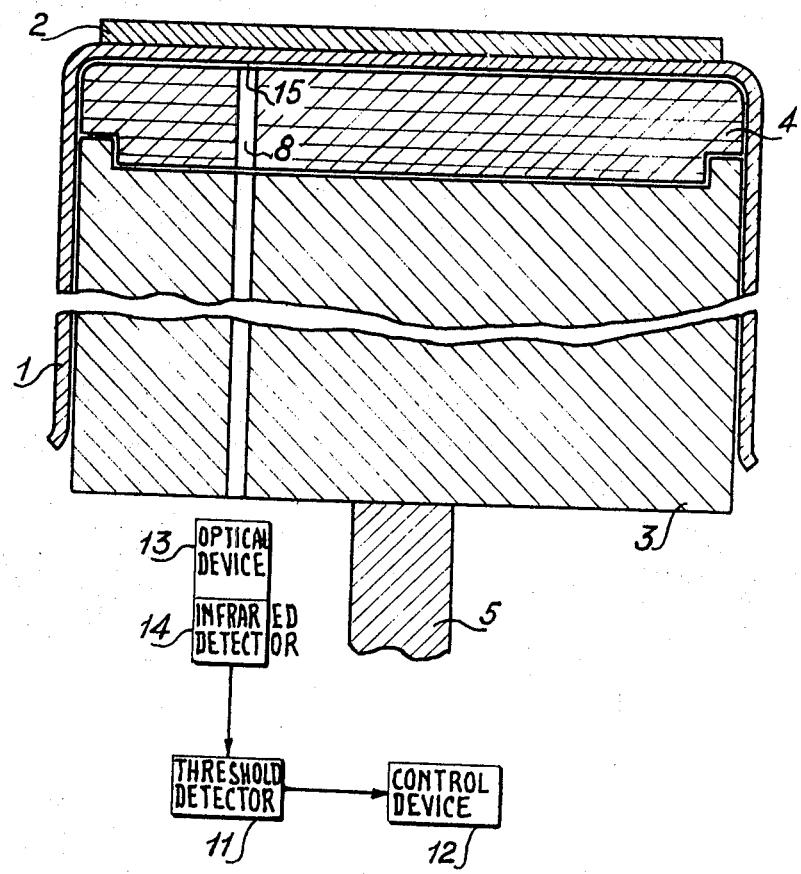
FIG. 3 illustrates a different embodiment of temperature measurement.
Figure 4:
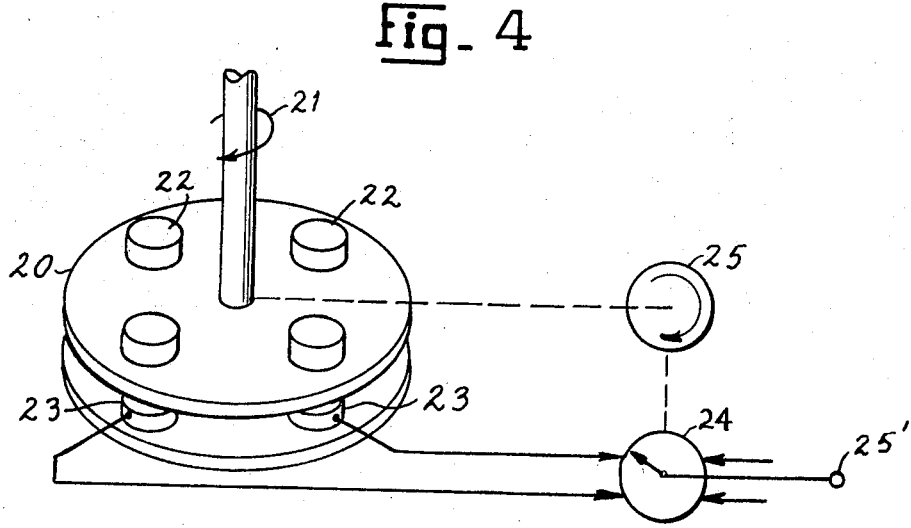
FIG. 4 is a schematic presentation of a multiple-station temperature sensing arrangement.

FIG. 3 illustrates an embodiment of the invention in which the control of power supplied to the induction heater, for the press, is obtained by means of a heat radiation detector, such as an infrared detector. An optical focusing arrangement 13 projects infrared radiation emitted from a small region 15 at the surface of the workpiece on an IR detector 14, filtering out visible light. Within a certain spectrum, that is within a certain frequency band, the intensity of emitted radiation will be a function which increases with temperature. Emitted radiation is thus filtered to a predetermined spectrum in a filter, not shown separately and which may be part of element 13, and focused on the sensitive surface of the IR detector 14 so that only that frequency within the spectrum, and emitted from the surface selected at the workpiece 1 as seen by detector 14. Hole 8 will have to be somewhat larger than that required for the opening in connection with the embodiment of FIGS. 1 and 2, so that the radiation emitted by the mandrel 3 and workpiece 4 will not interfere with the actual heat being sensed from region 15. At each operation of the heat fusion step, the mandrel 3, and particularly the part 4 which is in contact with the workpiece, will increase in temperature; this increase in ambient conditions must be isolated from detector 14. Optical element 13 preferably includes optically reflecting mirrors, or lenses of a material which may be opaque to visible light, such as silicon or germanium. The infrared detector 14 can be any well known device to detect infrared radiation, and may include a thermocouple, or a thermal battery, that is a combination of a series of a group of thermocouples, the junctions of which are preferably blackened in order to better absorb radiation transmitted by optical element 13; bolometers which are heat sensitive and located in the line of radiation received from optical element 13, as well as photoemissive or photoconductive elements sensitive to infrared radiation may also be used. Photoemissive cells usually consist of a layer of semiconductor on a metallic base. The semiconductor may be ($Bi_2 S_3$), or thallium, in a vacuum. Photoconductive cells, changing their internal resistance upon being irradiated usually are photoconductors of the lead sulfide (PbS) type, or selenium. Photomultipliers having cathodes sensitive to infrared radiation may also be used. The combination of the optical system 13 and the heat sensitive, infrared detector 14 is generally called an optical pyrometer.

The electrical signals derived at the output of the pyrometer 14 are applied to a temperature measuring indicating apparatus, not illustrated, and to a threshold detector 11 which provides an output signal when the temperature exceeds a certain limit, that is, when the electrical signal reaches a level which exceeds that of a predetermined threshold. The control element 12, controlled by the signal from threshold detector 11 may be identical to that discussed in connection with FIG. 1.

Optical element 13 should be so arranged that any radiation from the upper portion of mandrel 4, that is from the asbestos cement layer and from adjacent portions does not reach the target of the photosensitive detector 14. Only the temperature actually sensed in region 15 should be applied, by radiation, on detector 14. The hole 8 thus must be increased in dimension; alternatively, the mandrel may be water cooled, for example by circulation of water therethrough; alternatively, a radiation guide may be inserted in hole 8 for example in the form of a hollow cylinder having an interior surface which is perfectly reflecting and does not emit radiation itself on detector 14. Alternatively, a plurality of apertures may be interposed in the optical path to element 13, and element 13 itself may be apertured so that a sharply focused beam of radiation, only, is received and directed on detector 14. Apertures, and particularly diaphragm apertures can be kept at a temperature much less than that of the surrounding structure. The optical unit 13, itself, can be secured to the mandrel. If a multiple-station apparatus is desired, a single radiation sensitive element 14, and located in radiation receiving relationship to all the mandrels, as they travel in a predetermined production path thereover, can be provided, thus avoiding the necessity of a commutating switch, like switch 24, (FIG. 4) and saving on equipment. Alternatively, optical devices 13 may, itself, be located only in one position and in radiation receiving relationship to the hole 8 when the mandrel is under the heating press.

The brazing press of the present invention has been described particularly in connection with an induction heating arrangement, as more specifically set forth in the aforementioned application; other heating arrangement may be used, as determined by the design and requirements of the process to be carried out and falling within the scope of the inventive concept.

We claim:

1. Brazing press for inductively brazing together a plurality of metal plates including:
   an upper and a lower press stem;
   mandrel means, for supporting one of said plates, carried by said lower stem;
   electrical induction heating means comprising: an inductor carried by said upper stem for heating said plates and a high frequency generator for feeding said inductor;
   means for sensing the temperature to which the area of said supported plate, which is heated by said heating means, is being carried including:
   a thin plate of nonoxidizing metal and which has low-specific heat, substantially covering the entire area affected by said inductor, inserted between said mandrel means and said supported plate;
   a thermocouple soldered by its junction to said thin plate for delivering an electrical signal function of said temperature; and
   an aperture facing said thermocouple formed in said mandrel means and extending therethrough for the passage of the leads of said thermocouple;
   and means for automatically controlling the operation of said induction heating means and of said press including:
   threshold detector means fed by said thermocouple for delivering an electrical control signal when said signal function of said temperature reaches a predetermined threshold value corresponding to a temperature within the range needed for correctly brazing together said metal plates;
   and control means comprising switching means, fed by said control signal for cutting off the operation of said high frequency generator.

2. Press according to claim 1, wherein the thin plate comprises stainless steel.

3. Brazing press for inductively brazing together a plurality of metal plates including:
- an upper and a lower press stem;
- mandrel means, for supporting one of said plates, carried by said lower stem;
- electrical induction heating means including: an inductor carried by said upper stem for heating said plates and a high frequency generator for feeding said inductor;
- means for sensing the temperature to which the area of said supported plate which is heated by said heating means, is being carried including:
- an aperture facing an area of said supported plate heated by said heating means formed in said mandrel means and extending therethrough perpendicularly with respect to said supported plate for letting pass through infrared radiation from said area thereof, the amount of said radiation being a function of said temperature:
- infrared radiation detector means including infrared optical means located in radiation-receiving relation to said area of said supported plate for delivering an electrical signal function of the amount of radiation received;
- and means for automatically controlling the operation of said induction heating means and of said press including:
- threshold detector means fed by said infrared detector means for delivering an electrical control signal when said electrical signal function said radiation amount reaches a predetermined threshold value corresponding to a temperature within the range needed for correctly brazing together said metal plates; and
- control means, comprising switching means, fed by said control signal for cutting of the operation off said high frequency generator.

* * * * *